(12) United States Patent
Blackmur

(10) Patent No.: US 9,476,495 B2
(45) Date of Patent: Oct. 25, 2016

(54) FLUTED SPROCKET/COG BORE FOR REDUCED MACHINING CYCLE TIMES AND REDUCED TOOL WEAR

(71) Applicant: BorgWarner Inc., Auburn Hills, MI (US)

(72) Inventor: Shawn J. Blackmur, Brooktondale, NY (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 14/435,514

(22) PCT Filed: Oct. 2, 2013

(86) PCT No.: PCT/US2013/062951
§ 371 (c)(1),
(2) Date: Apr. 14, 2015

(87) PCT Pub. No.: WO2014/062374
PCT Pub. Date: Apr. 24, 2014

(65) Prior Publication Data
US 2015/0276038 A1    Oct. 1, 2015

Related U.S. Application Data

(60) Provisional application No. 61/715,615, filed on Oct. 18, 2012.

(51) Int. Cl.
| | | |
|---|---|---|
| *F16H 55/30* | (2006.01) |
| *B60B 27/00* | (2006.01) |
| *F16D 1/06* | (2006.01) |
| *F16H 55/36* | (2006.01) |
| *B21K 1/40* | (2006.01) |

(Continued)

(52) U.S. Cl.
CPC ............. *F16H 55/30* (2013.01); *B21K 1/30* (2013.01); *B21K 1/40* (2013.01); *F16H 55/17* (2013.01); *F16H 55/36* (2013.01); *Y10T 29/49467* (2015.01)

(58) Field of Classification Search
CPC ....... Y10S 474/903; F01L 1/02; F01L 1/024; F01L 1/026; Y10T 403/7021
USPC ...................... 474/903, 152; 403/1
See application file for complete search history.

(56) References Cited

U.S. PATENT DOCUMENTS

| | | | | |
|---|---|---|---|---|
| 143,849 A * | 10/1873 | Sanford | ............... | F16B 7/1427 403/104 |
| 630,868 A * | 8/1899 | Dorman | ............... | F16H 55/46 403/344 |
| 730,591 A * | 6/1903 | Allen | ............... | B62J 99/00 301/84 |

(Continued)

*Primary Examiner* — Henry Liu
(74) *Attorney, Agent, or Firm* — Helmholdt Law PLC; Thomas D. Helmholdt

(57) ABSTRACT

A rotary member (10) of an endless loop power transmission system can have a hub (12) for a centered connection to a shaft. The hub (12) can have a central aperture (18) extending therethrough and a plurality of radially inwardly projecting and axially extending flutes (14) formed on an inner circumferential surface (16) of the central aperture (18) defining reduced circumferential surface areas (16a) for machining a central bore (18a) through the hub (12). An interrupted finishing machining cut along the reduced circumferential surface areas (16a) of the central aperture (18) provides increased coolant flushing, while reducing finishing machining cycle times, and reducing load and wear on a bore cutter.

15 Claims, 1 Drawing Sheet

(51) Int. Cl.
 *F16H 55/17* (2006.01)
 *B21K 1/30* (2006.01)

(56) References Cited

U.S. PATENT DOCUMENTS

| | | | | | |
|---|---|---|---|---|---|
| 1,352,997 | A * | 9/1920 | Summers | | E02F 3/145 |
| | | | | | 474/196 |
| 1,909,500 | A * | 5/1933 | Ornitz | | F16D 1/06 |
| | | | | | 403/11 |
| 2,119,334 | A * | 5/1938 | Leffler | | F16D 1/08 |
| | | | | | 29/432 |
| 2,932,207 | A * | 4/1960 | Whitney | | F16H 55/30 |
| | | | | | 403/362 |
| 3,237,469 | A * | 3/1966 | Berry | | F01L 1/02 |
| | | | | | 403/230 |
| 3,415,137 | A * | 12/1968 | Casale | | F01L 1/02 |
| | | | | | 123/90.15 |
| 3,501,973 | A * | 3/1970 | Casale | | F16H 1/00 |
| | | | | | 403/356 |
| 3,905,710 | A * | 9/1975 | Cain | | F16D 1/0876 |
| | | | | | 403/356 |
| 3,962,929 | A * | 6/1976 | Silvon | | B27B 17/08 |
| | | | | | 474/152 |
| 4,144,755 | A * | 3/1979 | Palloch | | F16H 55/36 |
| | | | | | 403/16 |
| 4,252,201 | A * | 2/1981 | Dowis | | E21B 4/006 |
| | | | | | 175/279 |
| 4,603,597 | A * | 8/1986 | Onorati | | F16D 1/06 |
| | | | | | 403/326 |
| 4,631,974 | A * | 12/1986 | Wiegand | | F16H 55/06 |
| | | | | | 474/152 |
| 5,137,142 | A * | 8/1992 | Reeves | | B65H 27/00 |
| | | | | | 193/37 |
| 5,181,432 | A * | 1/1993 | Allen | | F01L 1/02 |
| | | | | | 116/200 |
| 5,370,587 | A * | 12/1994 | Johnson | | F16D 1/0858 |
| | | | | | 474/166 |
| 5,393,271 | A * | 2/1995 | Sands | | F16H 55/12 |
| | | | | | 474/162 |
| 5,408,854 | A * | 4/1995 | Chiu | | B60B 37/04 |
| | | | | | 301/111.02 |
| 5,469,958 | A * | 11/1995 | Gruettner | | B65G 23/06 |
| | | | | | 198/834 |
| 5,538,355 | A * | 7/1996 | Burr | | F04C 15/0076 |
| | | | | | 403/355 |
| 5,816,968 | A * | 10/1998 | Watson | | B22F 7/062 |
| | | | | | 474/152 |
| 5,980,406 | A * | 11/1999 | Mott | | F16H 7/06 |
| | | | | | 474/152 |
| 6,125,712 | A * | 10/2000 | Kaburagi | | F16D 1/108 |
| | | | | | 403/14 |
| 6,186,710 | B1 * | 2/2001 | Saniez | | B23B 31/008 |
| | | | | | 29/525 |
| 6,575,539 | B2 * | 6/2003 | Reich | | A61G 5/10 |
| | | | | | 180/21 |
| 7,255,481 | B2 * | 8/2007 | Mermoud | | B60B 27/00 |
| | | | | | 152/417 |
| 7,393,281 | B2 * | 7/2008 | Nosaka | | F16D 9/08 |
| | | | | | 464/32 |
| 7,435,197 | B2 * | 10/2008 | Kamada | | B62M 9/10 |
| | | | | | 474/152 |
| 8,133,142 | B2 * | 3/2012 | Gerlich | | F16D 1/108 |
| | | | | | 474/153 |
| 2010/0162841 | A1 * | 7/2010 | Cavalerie | | B62M 11/06 |
| | | | | | 74/335 |
| 2011/0133406 | A1 * | 6/2011 | Chiu | | A63F 9/0819 |
| | | | | | 273/276 |
| 2011/0311387 | A1 * | 12/2011 | Schultz | | F01C 19/085 |
| | | | | | 418/230 |
| 2012/0201602 | A1 * | 8/2012 | Sina | | E01C 19/286 |
| | | | | | 404/75 |
| 2014/0231116 | A1 * | 8/2014 | Pollock | | B25B 21/00 |
| | | | | | 173/183 |

\* cited by examiner

FLUTED SPROCKET/COG BORE FOR REDUCED MACHINING CYCLE TIMES AND REDUCED TOOL WEAR

FIELD OF THE INVENTION

The present invention relates to a fluted rotary member, such as a sprocket, gear, pulley, or cog with a machined bore, where the fluted surface of the rotary member reduces material to be removed in subsequent finishing operations.

BACKGROUND

It is generally know to provide a rotary member, such as a sprocket, gear, pulley, or cog by compacting, forging, molding, and stamping manufacturing techniques. These known rotary member manufacturing techniques provide unfinished bores that require finishing operations to provide a precision surface for contact with a shaft. The finishing operation requires machining along an entire internal circumference of the bore to be provided in the rotary member, which is a very time consuming machining operation and subjects the manufacturing equipment to increased load and wear on the cutting tool element.

SUMMARY

It would be desirable to reduce the load on manufacturing equipment during the bore forming machining operation on a rotary member, such as a sprocket, gear, pulley, or cog. It would be desirable to increase coolant flushing during finishing machining operations forming a bore within a rotary member. It would be desirable to reduce the machining cycle time of the bore forming machining operation. It would be desirable to reduce cutting tool wear while forming a bore in a rotary member.

Accordingly, a rotary member, by way of example and not limitation, such as a sprocket, gear, pulley, or cog, can have an internally fluted central aperture manufactured, by way of example and not limitation, by compacting, forging, molding, or stamping with the purpose of reducing material to be removed in subsequent finishing operations. The interrupted cut along a radially inwardly extending flute will provide increased coolant flushing while also reducing the load on the manufacturing equipment. The inwardly extending flutes are used to reduce machining stock but still provide centering of the rotary member with respect to a shaft. The fluted bore can contact a connected shaft and can provide sufficient surface contact to keep the shaft located properly. The flutes can be shallow or deep. If shallow flutes are provided, the flutes can be eliminated in finishing operations. By way of example and not limitation, the rotary member, such as a sprocket, gear, pulley, or cog, can be used in timing systems, alternator pulleys, power steering pulleys, and timing system cogs or similar systems.

In a simple configuration, a rotary member has a hub for connection to a shaft. The hub has an inner surface defining a central aperture extending therethrough, and a plurality of flutes formed on the inner surface of the central aperture.

By way of example and not limitation, a rotary member of an endless loop power transmission system can include a hub for a centered connection to a shaft. The hub can have an inner surface defining a central aperture extending therethrough, and a plurality of radially inwardly projecting and axially extending flutes formed on the inner surface of the central aperture defining reduced circumferential surface areas for machining a central bore through the hub.

A process is disclosed for manufacturing a rotary member having a hub for connection to a shaft. The process can include forming the hub with an inner surface defining a central aperture extending therethrough, forming a plurality of radially inwardly projecting and axially extending flutes on the inner surface of the aperture to define reduced circumferential surface areas for machining a central bore through the hub, and machining the plurality of flutes on the inner surface of the aperture to define a central bore through the hub.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
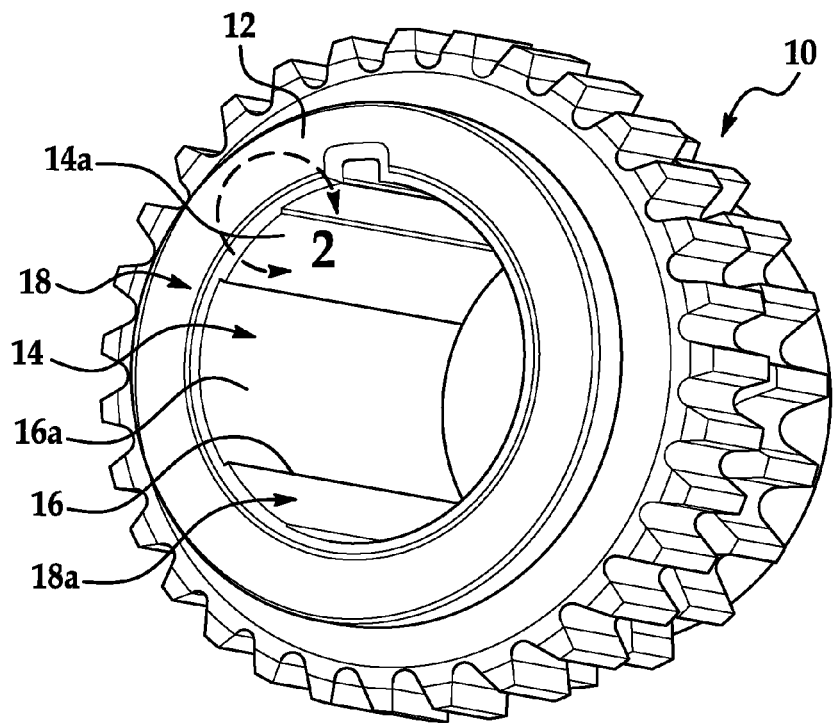
FIG. 1 is a schematic view of a rotary member having an internal aperture with a plurality of radially inwardly and axially extending flutes.
Figure 2:
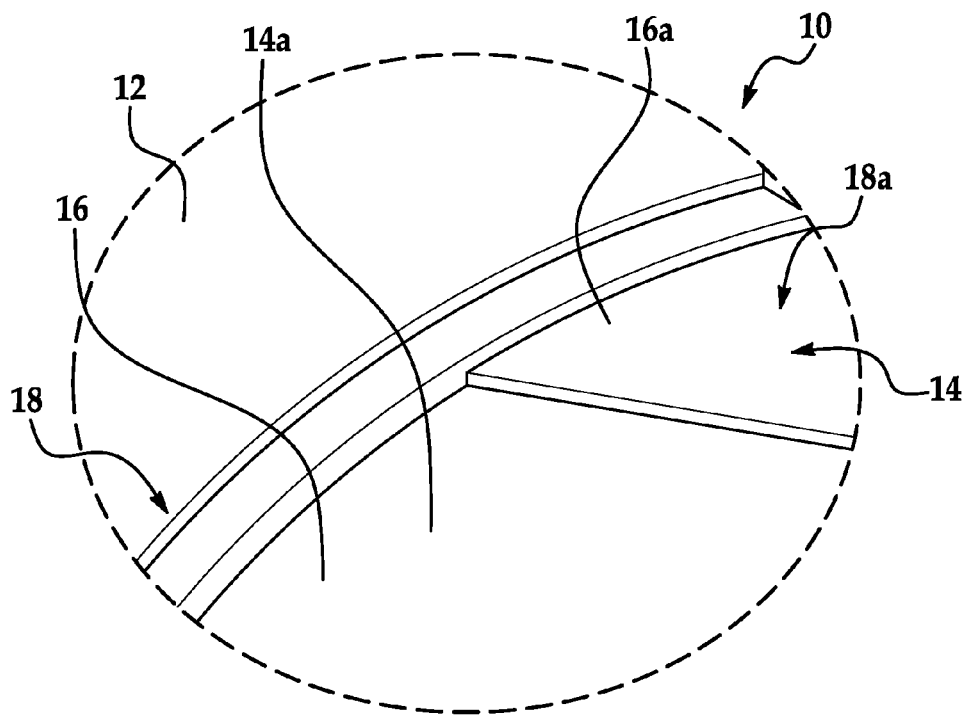
FIG. 2 is an enlarged detail of a radially inwardly and axially extending flute.

Referring now to FIG. 1, by way of example and not limitation, a rotary member 10, sometimes referred to herein as a sprocket, gear, pulley or cog, for an endless loop power transmission system is illustrated having a hub 12. The hub 12 includes a plurality of radially inwardly and axially extending flutes 14, sometimes referred to herein as raised flutes, formed along an inner circumferential surface 16 of an aperture 18 and extending axially through the hub 12 of the rotary member 10. The raised flutes 14 reduce an amount of material stock to be removed during finishing machining operations, while providing a finished surface after machining for centering the sprocket 10 on a shaft (not shown).

A rotary member 10 of an endless loop power transmission system includes a hub 12 for centered connection to a shaft (not shown). The hub 12 has an inner circumferential surface 16 defining a central aperture 18 extending therethrough with a plurality of flutes 14 on the inner circumferential surface 16 of the central aperture 18. The plurality of flutes 14 project radially inwardly and extend axially through the hub 12. The plurality of flutes 14 define reduced circumferential surface areas 16a for machining a central bore 18a through the hub 12.

An interrupted machining cut is performed along the reduced circumferential surface areas 16a of the aperture 18 to form the central bore 18a. The interrupted machining cut formed along the reduced circumferential surface areas 16a of the aperture 18 provides increased coolant flushing. The interrupted machining cut formed along the reduced circumferential surface areas 16a of the aperture 18 provides a reduced finishing machining cycle time for the central bore 18a of the hub 12. The interrupted machining cut formed along the reduced circumferential surface areas 16a of the aperture 18 provides a reduced load and reduced wear on a bore cutter used to form the central bore 18a of the hub. The plurality of flutes 14 support the hub 12 centered on a shaft (not shown) after the finishing interrupted machining cut forms the central bore 18a along the reduced circumferential surface areas 16a of the aperture 18 of the hub 12.

A rotary member 10 of an endless loop power transmission system includes a hub 12 for a centered connection to a shaft (not shown). The hub 12 has a central aperture 18 extending therethrough. The central aperture 12 has a plurality of radially inwardly projecting and axially extending flutes 14 on an inner circumferential surface 16 of the central aperture 18. The plurality of flutes 14 define reduced circumferential surface areas 16a for machining a central bore 18a through the hub 12.

An interrupted machining cut is performed along the reduced circumferential surface areas 16a of the central aperture 18. The interrupted machining cut performed along the reduced circumferential surface areas 16a of the central aperture 18 provides increased coolant flushing, a reduced finishing machining cycle time for the hub, and a reduced load and wear on a bore cutter. The plurality of flutes 14 support the hub 12 centered on a shaft (not shown) after a finishing interrupted machining cut is performed along the reduced circumferential surface areas 16a of the aperture 12 defines the central bore 18a.

A process is also disclosed for manufacturing a rotary member 10 of an endless loop power transmission system. The rotary member 10 includes a hub 12 for a centered connection to a shaft (not shown). The process includes forming the hub 12 with a central aperture 18 extending through the hub 12. The hub 12 has a plurality of radially inwardly projecting and axially extending flutes 14 formed on an inner surface of the central aperture 18 defining reduced circumferential surface areas 16a for machining a central bore 18a through the hub 12. The process includes machining the plurality of flutes 14 located on the inner circumferential surface 16 of the aperture 18 to define a central bore 18a through the hub 12.

The process can include providing increased coolant flushing while reducing finishing machining cycle times and reducing load and wear on a bore cutter with an interrupted cut along the reduced surface areas 16a of the aperture 18 of the hub 12. The process can include supporting the hub 12 centered on a shaft (not shown) from the plurality of flutes 14 after a finishing interrupted machining cut along the reduced circumferential surface areas 16a of the aperture 18 of the hub 12.

It should be recognized that the disclosed hub configuration and process can be used in other applications in addition to the disclosed embodiment of an endless loop power transmission system. Any rotary member having a hub for centered support on a shaft can take advantage of the hub configuration and process disclosed herein. The rotary member 10 including the hub 12 and plurality of flutes 14 can be manufactured using any known suitable manufacturing process, by way of example and not limitation, such as compacting, forging, molding, or stamping. The rotary member 10 can be formed as a sprocket, gear, pulley, or cog. The plurality of flutes 14 provide material extending axially and radially inwardly from an inner circumferential surface 16 of the aperture 18 of the hub 12 for removal in subsequent finishing operations while forming or cutting a central bore 18a through the aperture 18 in the hub 12. Circumferential spaces 14a defined between adjacent flutes 14 provide openings for increased coolant flushing during the central bore 18a forming machining operations on the hub 12. The circumferential spaces 14a reduce the amount of material to be removed during the central bore 18a finish machining operations on the hub 12. The reduced amount of material to be removed reduces the load on the machining equipment and reduces the wear on the central bore 18a cutting tool.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A rotary member (10) of an endless loop power transmission system comprising:
   a hub (12) having a plurality of radially inwardly projecting and axially extending flutes (14) formed on an inner circumferential surface (16) of a central aperture (18) to define radially inwardly located reduced diameter circumferential surface areas (16a), the reduced diameter circumferential surface areas (16a) machined to define circular arcs of a central bore (18a) through the hub (12) to provide a centered connection to a shaft.

2. The rotary member (10) of claim 1 further comprising:
   an interrupted machining bore cut formed along the reduced diameter circumferential surface areas (16a) of the central aperture (18).

3. The rotary member (10) of claim 2, wherein the interrupted machining bore cut formed along the reduced diameter circumferential surface areas (16a) of the central aperture (18) provides increased coolant flushing, a reduced finishing machining cycle time for the hub, and reduced load and wear on a bore cutter.

4. The rotary member (10) of claim 1 further comprising:
   the plurality of flutes (14) for supporting the hub (12) centered on a shaft after a finishing interrupted machining bore cut along the reduced diameter circumferential surface areas (16a) of the central aperture (18) to provide a precision surface for contact with the shaft.

5. In a process for manufacturing a rotary member (10) having a hub (12) for connection to a shaft, the improvement comprising:
   forming the hub (12) with an inner circumferential surface (16) defining a central aperture (18) extending therethrough, the inner circumferential surface (16) including a plurality of radially inwardly projecting and axially extending flutes (14) on the inner circumferential surface (16) of the central aperture (18) to define reduced diameter circumferential surface areas (16a) for machining a central bore (18a) through the hub (12); and
   machining the reduced diameter circumferential surface areas (16a) of the plurality of flutes (14) to define circular arcs of a central bore (18a) through the hub (12) to provide a centered connection to a shaft.

6. The process of claim 5 further comprising:
   providing increased coolant flushing while reducing finishing machining cycle times and reducing load and wear on a bore cutter with an interrupted cut along the reduced diameter circumferential surface areas (16a) of the central aperture (18).

7. The process of claim 5 further comprising:
   supporting the hub (12) centered on a shaft from the plurality of flutes (14) after a finishing interrupted machining cut along the reduced diameter circumferential surface areas (16a) of the central aperture (18) to provide a precision surface for contact with the shaft.

8. The rotary member (10) formed by the process of claim 5 further comprising:

the hub (12) having an inner circumferential surface (16) defining a central aperture (18) extending therethrough, and a plurality of flutes (14) formed on the inner circumferential surface (16) of the central aperture (18).

9. The rotary member (10) formed by the process of claim 8 further comprising:
the plurality of flutes (14) projecting radially inwardly and extending axially through the hub (12).

10. The rotary member (10) formed by the process of claim 8 further comprising:
the plurality of flutes (14) defining radially inwardly located reduced diameter circumferential surface areas (16a) for machining a central bore (18a) through the hub (12).

11. The rotary member (10) of claim 8 further comprising:
an interrupted machining cut formed along the reduced diameter circumferential surface areas (16a) of the central aperture (18).

12. The rotary member (10) of claim 9, wherein the interrupted machining cut formed along the reduced diameter circumferential surface areas (16a) of the central aperture (18) provides increased coolant flushing.

13. The rotary member (10) of claim 9, wherein the interrupted machining cut along the reduced diameter circumferential surface areas (16a) of the central aperture (18) provides a reduced finishing machining cycle time for the hub (12).

14. The rotary member (10) of claim 9, wherein the interrupted machining cut along the reduced diameter circumferential surface areas (16a) of the central aperture (18) provides a reduced load and reduced wear on a bore cutter.

15. The rotary member (10) of claim 8 further comprising:
the plurality of flutes (14) for supporting the hub (12) centered on a shaft after a finishing interrupted machining cut along the reduced diameter circumferential surface areas (16a) of the central aperture (18) to provide a precision surface for contact with the shaft.

\* \* \* \* \*